United States Patent
Wang et al.

(10) Patent No.: US 11,720,205 B2
(45) Date of Patent: Aug. 8, 2023

(54) TOUCH REPORT RATE OF TOUCHSCREEN

(71) Applicants: STMICROELECTRONICS LTD., Kowloon (HK); STMICROELECTRONICS (BEIJING) R&D CO. LTD, Beijing (CN)

(72) Inventors: Yuan Yun Wang, New Taipei (TW); Pengcheng Wen, Beijing (CN); Yingying Sun, Beijing (CN); Yue Ding, Beijing (CN)

(73) Assignees: STMICROELECTRONICS LTD., Kowloon (HK); STMICROELECTRONICS (BEIJING) R&D CO. LTD, Beijing (CN)

( * ) Notice: Subject to any disclaimer, the term of this patent is extended or adjusted under 35 U.S.C. 154(b) by 0 days.

(21) Appl. No.: 17/562,552

(22) Filed: Dec. 27, 2021

(65) Prior Publication Data

US 2023/0205359 A1  Jun. 29, 2023

(51) Int. Cl.
*G06F 3/041* (2006.01)
*G06F 3/044* (2006.01)

(52) U.S. Cl.
CPC ........ *G06F 3/04166* (2019.05); *G06F 3/0446* (2019.05)

(58) Field of Classification Search
CPC ....................................................... G06F 3/044
See application file for complete search history.

(56) References Cited

U.S. PATENT DOCUMENTS

| | | | |
|---|---|---|---|
| 9,933,883 B2 | 4/2018 | Kim et al. | |
| 10,185,421 B2 | 1/2019 | Kim et al. | |
| 10,275,070 B2 | 4/2019 | Fu et al. | |
| 10,318,059 B2 | 6/2019 | Kim et al. | |
| 10,628,029 B2 | 4/2020 | Schillings et al. | |
| 2012/0169646 A1 | 7/2012 | Berkes et al. | |
| 2012/0206380 A1 | 8/2012 | Zhao et al. | |
| 2014/0152590 A1 | 6/2014 | Brown et al. | |
| 2015/0241950 A1* | 8/2015 | Ng | G06F 1/3262 345/174 |
| 2015/0346864 A1* | 12/2015 | Yang | G06F 3/04186 345/174 |
| 2015/0355772 A1* | 12/2015 | Hewitt | G06F 16/248 345/173 |
| 2016/0195988 A1 | 7/2016 | Fu et al. | |
| 2017/0153768 A1 | 6/2017 | Yeh | |

* cited by examiner

*Primary Examiner* — Robin J Mishler
(74) *Attorney, Agent, or Firm* — Slater Matsil, LLP

(57) ABSTRACT

A method for reporting touch on a touchscreen includes detecting first touch data from the touchscreen corresponding to a first touch on the touchscreen; determining coordinates of the first touch from the first touch data; reporting the coordinates of the first touch at a first time; determining predicted coordinates of a second touch based on a linear regression of historical touch data; and reporting the predicted coordinates of the second touch at a second time, where the second time occurs after the first time.

21 Claims, 6 Drawing Sheets

TOUCH REPORT RATE OF TOUCHSCREEN

TECHNICAL FIELD

The present invention relates generally to a electronic device, and, in particular embodiments, to touch report rate of touchscreen.

BACKGROUND

Electronic devices that are designed for user interaction have historically utilized external input devices such as keyboards, key pads, and/or mice to capture user input. In recent years, there has been a push from the more traditional methods, as consumers prefer the convenience of portable devices that can support a more flexible lifestyle. This has resulted in an increase in the use of touchscreens in electronic devices. Touchscreens provide a user with functionality of traditional electronics along with additional features such as using the touchscreen for sketching, drawing, and hand writing applications.

As electronic devices, such as mobile phones, tablets, laptops, gaming systems, personal computers, and the like are increasingly using touch sensitive displays, the user experience is becoming more important. In particular, the interaction between the electronic device and a user are becoming increasingly important.

Electronic devices that include a touchscreen allow a user to touch the screen to input an instruction or a message by pressing a touch sensor on the screen using a finger or an object such as a stylus while viewing an image displayed on the screen. In other words, when a particular spot of the touch screen is touched, the device may detect the coordinates of the touch and perform a predetermined operation.

The ability of touchscreen to detect touch from a user and perform the predetermined action is known as touch responsiveness. The quality of the touch responsiveness of a touchscreen may be determined by the touch report rate of the touchscreen. The faster the touch report rate, the better the touch responsiveness.

SUMMARY

In accordance with an embodiment of the present invention, a method for reporting touch on a touchscreen includes detecting first touch data from the touchscreen corresponding to a first touch on the touchscreen; determining coordinates of the first touch from the first touch data; reporting the coordinates of the first touch at a first time; determining predicted coordinates of a second touch based on a linear regression of historical touch data; and reporting the predicted coordinates of the second touch at a second time, where the second time occurs after the first time.

In accordance with an embodiment of the present invention, a method for reporting touch on a touchscreen includes performing, at a suitable frequency, a sensing scan of the touchscreen to obtain sensed touch data; storing, in a non-transitional memory, the obtained sensed touch data; determining, at the first frequency, a first calculated touch data based on a machine learning model and the sensed touch data; and transmitting, at a multiple of the first frequency, the sensed touch data or the first calculated touch data to an external device.

In accordance with an embodiment of the present invention, a device include a processor; a memory for storing a program to be executed in the processor, the program including instructions when executed cause the processor to: detect first touch data from the touchscreen corresponding to a first touch on the touchscreen; determine coordinates of the first touch from the first touch data; report the coordinates of the first touch at a first time; determine predicted coordinates of a second touch based on historical touch data and a linear regression; and report the predicted coordinates of the second touch at a second time, where the second time occurs after the first time.

BRIEF DESCRIPTION OF THE DRAWINGS

For a more complete understanding of the present invention, and the advantages thereof, reference is now made to the following descriptions taken in conjunction with the accompanying drawings, in which:

FIGS. 1A-1C illustrate an electronic device having a touchscreen that is configured to report touches at an improved touch report rate in accordance with an embodiment of the present application, wherein FIG. 1A illustrates a component schematic of the electronic device, FIG. 1B illustrates a schematic cross-sectional view of the touchscreen, and FIG. 1C illustrates a schematic circuit of a touch sensitive layer of the electronic device;

DETAILED DESCRIPTION OF ILLUSTRATIVE EMBODIMENTS

While touchscreens have led to great advances in the evolution of portable electronic devices, there are limitations that still exist. Namely, touch responsiveness, or the ability of a device, to detect a touch input of a user and perform a predetermined task based on the touch is limited by the touch report rate. In conventional touch report methods, a touchscreen controller performs sensing scans of the touchscreen at a frequency to detect touch data. In other words, the touchscreen controller performs a plurality of sensing scans in corresponding scan frames. In parallel with the sensing scans, the touchscreen controller may perform processing steps to process the touch data detected in each sensing scan and determine coordinates of a touch. The processing steps may be performed at the same frequency or a different frequency than the sensing scans. At the conclusion of each of the processing steps, the touchscreen controller may report the touch. The time that elapses between reported touches is known as the touch report rate.

However, while the sensing scans and the processing steps are performed in parallel, as understood by those with ordinary skill in the art, a touch cannot be reported until touch data gathered by sensing scan is processed. In other words, each sensing scan frame may yield a single touch report that may occur after each sensing scan. Thus, after reporting a touch, a subsequent touch cannot be reported until after both of the next sensing scan and processing step are completed. Therefore, the touch report rate may be limited by the slowest process, i.e., the scan period or the processing period, whichever is longer.

The inventors of this application have identified that the touch report rate of conventional touch report methods is typically limited by the scan time of the electronic device. In other words, the scan time cannot be reduced to reduce the scan period in order to increase the touch report rate. If the scan time is reduced to increase the report rate, external factors like external noise and panel stack up may impact the precision of the data gathered during the scans.

Therefore, there is a need in the art to increase the touch report rate of an electronic device without decreasing the scan time.

Embodiments of the present application relate to a method for improving the report rate of an electronic device without having to increase the scan time. In particular, embodiments of the present application relate to a method of anticipating touch by a user based on previously collected subsets of touch data to reduce the report rate of an electronic device without increasing the scan time.

Figure 1A:
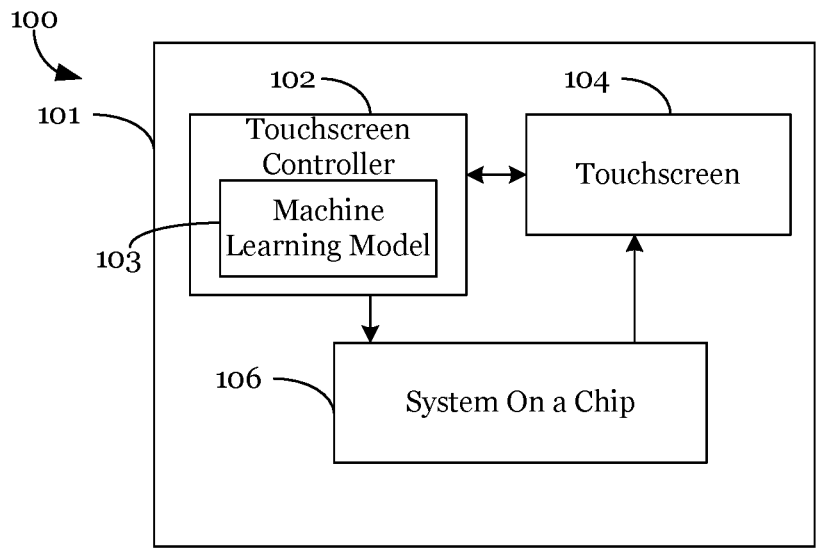
Figure 1B:
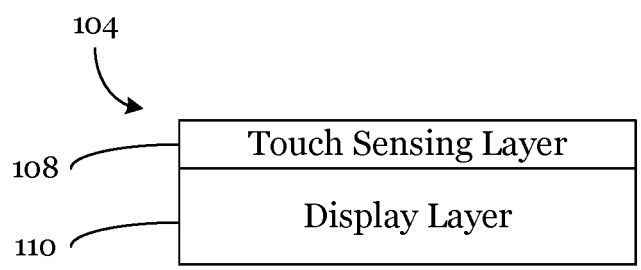
Figure 1C:
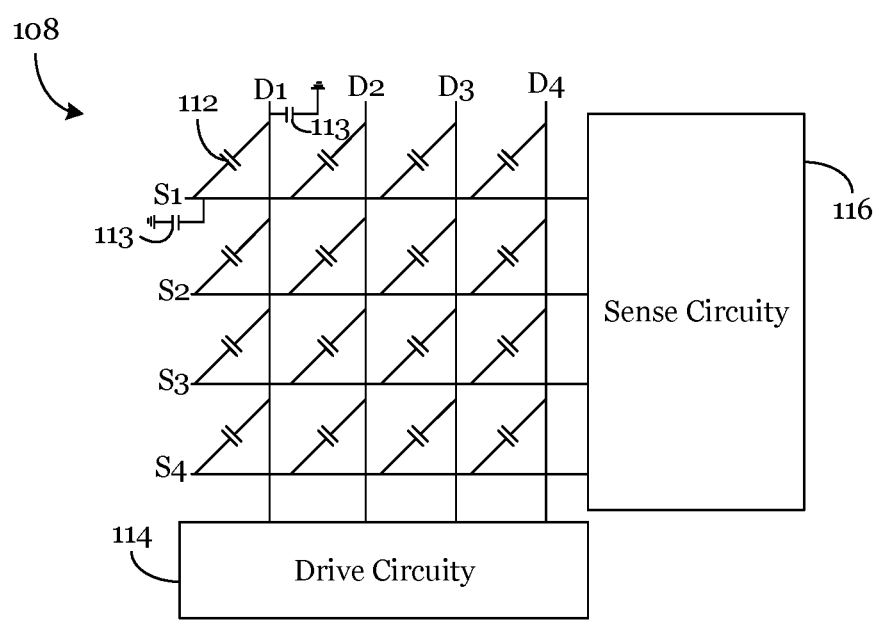

FIGS. 1A-1C illustrate an electronic device having a touchscreen that is configured to report touches at an improved report rate, wherein FIG. 1A illustrates a component schematic of the electronic device, FIG. 1B illustrates a component schematic of the touchscreen, and FIG. 1C illustrates a component schematic of a touch sensitive layer of the electronic device Referring to FIG. 1A, an electronic device 100 may include a touch sensitive interface system 101 situated on the front facing side of the electronic device 100. The electronic device 100 may comprise a smart phone, a GPS device, a tablet computer, a wearable, a mobile media player, a laptop, a gaming system, a personal computer, or any other electronic device that may utilize a touchscreen 104.

The touch sensitive interface system 101 may be configured to accept user input via a touching such as a touching from a user's body (e.g. a finger) and/or a tool such as a stylus as well as physical contact by other types of objects such as robotic arms. The touch sensitive interface system 101 may also provide an output, such as a user readable display based on the touch.

The touch sensitive interface system 101 may include a touchscreen controller 102, a touchscreen 104, and a system on a chip 106 which may be electronically coupled to each other through a bus.

In various embodiments, the system on a chip 106 may comprise a processor, interface, circuitry, and/or the like configured to direct the flow of input and output data to the touchscreen 104 and the associated touchscreen controller 102. A memory may be integrated onto the system on a chip 106. The memory may be programmed for short term and/or long term memory storage. The memory may comprise various programs to be executed in the touchscreen controller 102. The memory may include both volatile and non-volatile memories. The memory is designed to retain information generated by the touchscreen controller 102 so it can be recalled at a later time.

The touchscreen controller 102 may perform various methods with respect to the touchscreen 104. In various embodiments, the touchscreen controller 102 may include a processor that analyzes information and carries out a series of executable scripts, e.g., stored in the memory integrated into the system on a chip 106, based on user input. In one or more embodiments, the processor may comprise an application-specific integrated circuit (ASIC) device, a central processing unit (CPU), or any other processing unit known in the art. In various embodiments, the touchscreen controller 102 may comprise a number of separate computing units such as cores integrated within one processor, or distinct separate processing chips.

In various embodiments, a machine learning model 103 may be implemented on the touchscreen controller 102. Advantageously, the machine learning model 103 may be a machine learning model such as a neural network configured to anticipate touch coordinates by a user based on a previous touch. In other words, the machine learning model 103 may be trained to use a previous touch as an input and output a predicted next touch using a linear regression, such as a second order linear regression. The machine learning model 103 may be trained using historical touch data prior to being implemented onto the touchscreen controller 102. This will be described in more detail below.

The touchscreen 104 is designed to register user input via touches made to its surface. The electronic device 100 may also be configured to detect input from the touchscreen 104 that may also come from input given from a stylus (active or passive) device. In various embodiments, the touchscreen 104 may include sensors such as gyroscopes or accelerometers. One or more of these sensors may be integrated together.

FIG. 1B illustrates a schematic of the touchscreen 104. In various embodiments the touchscreen 104 may include a touch sensing layer 108 and a display layer 110. The touch sensing layer 108 and the display layer 110 may be situated on the front facing side of the electronic device 100. The display layer 110 may comprise a light emitting diode (LED) display, organic LED display, LCD, AMOLED, or any other type of display.

FIG. 1C illustrates a schematic of the touch sensing layer 108. In various embodiments, the touch sensing layer 108 may comprise drive lines D1-D4 and sense lines S1-S4 that span the entirety of the touchscreen 104 in a grid-like fashion that are operable by the touchscreen controller 102. In various embodiments, the drive lines D1-D4 may be formed in rows across the touchscreen 104 and the sense lines S1-S4 may be formed in columns across the touchscreen 104. In other embodiments, the drive lines D1-D4 may be formed in columns across the touchscreen 104 and sense lines S1-S4 may be formed in columns across the touch screen. In various embodiments, the number of drive lines may not be equal to the number of sense lines. Although four drive lines and four sense lines are illustrated in FIG. 1C, this is not indicative of the number of drive and sense lines that may be present on the touch sensing layer. The number of drive and sense lines used are not limited by this application.

The drive lines D1-D4 and the sense lines S1-S4 may overlap in certain embodiments. While FIG. 1C depicts the drive lines D1-D4 and the sense lines S1-S4 overlapping in an orthogonal manner, they may overlap other than orthogonally such as being interleaved or at various angles.

The drive lines D1-D4 and the sense lines S1-S4 may have a measurable mutual capacitance at their intersections as to form a matrix of mutual capacitors with mutual capacitances 112.

In various embodiments, the drive lines D1-D4 may be coupled to drive circuitry 114 and the sense lines S1-S4 may be coupled to sense circuitry 116 that are each coupled to the touchscreen controller 102. As appreciated by those with ordinary skill in the art, the each of the drive lines and the sense lines may also have a self-capacitance 113 that is measurable. In other words, the drive lines D1-D4 and the sense lines S1-S4 are operable in mutual sensing mode and a self-sensing mode.

In the mutual sensing mode, the touchscreen controller 102 may drive each row of the drive lines D1-D4 sequentially, and measure the change in the mutual capacitance 112 due to a change in a dielectric medium between a sensing line S1-S4 and a respective driven drive line D1-D4 using the sensing circuitry. In various embodiments, the drive lines D1-D4 may be driven using a periodic signal such as a sine wave, a square wave, or the like.

In other words, during a mutual sensing scan, when a drive line D1-D4 is being driven, electric fields form between intersections of the drive lines D1-D4. When a capacitive object such as human fingers or a passive stylus contact the touchscreen 104, the electric field lines going through the air between adjacent electrodes is replaced to pass through the capacitive objects. These interruptions in the electric fields cause a detectable change in the mutual capacitance 112 of the capacitors where the touches occur.

A self-sensing scan operates by measuring a change in the self-capacitance of each of the drive lines D1-D4 (or the sense lines S1-S4). In other words, the self-sensing scan may include driving each of the drive lines D1-D4 (or sense lines) (with a voltage) and scanning each of the drive lines D1-D4 (or sense lines). When a human finger (or another capacitive object) is brought proximate to a drive line D1-D4 (or sense line), it adds an additional self-capacitance that can be measured.

In various embodiments, the touch data gathered by the mutual sensing and/or self-sensing scans may be processed by the touchscreen controller 102. In other words, the touchscreen controller may analyze a matrix of touch data to determine the coordinates of touch. In other words, based on the touch data collected from scanning, the touchscreen 104 may be used by the touchscreen controller 102 to determine the coordinates of touch, and report them to the system on a chip 106. Then, the system on a chip 106 may provide an output to the touchscreen 104 based on the reported coordinates of touch.

Advantageously, embodiments of the present application disclose a method for reporting touch with an improved touch report rate without reducing the scan time that anticipates and reports touch by a user based on previously collected (e.g. historical) touch data.

Figure 2:
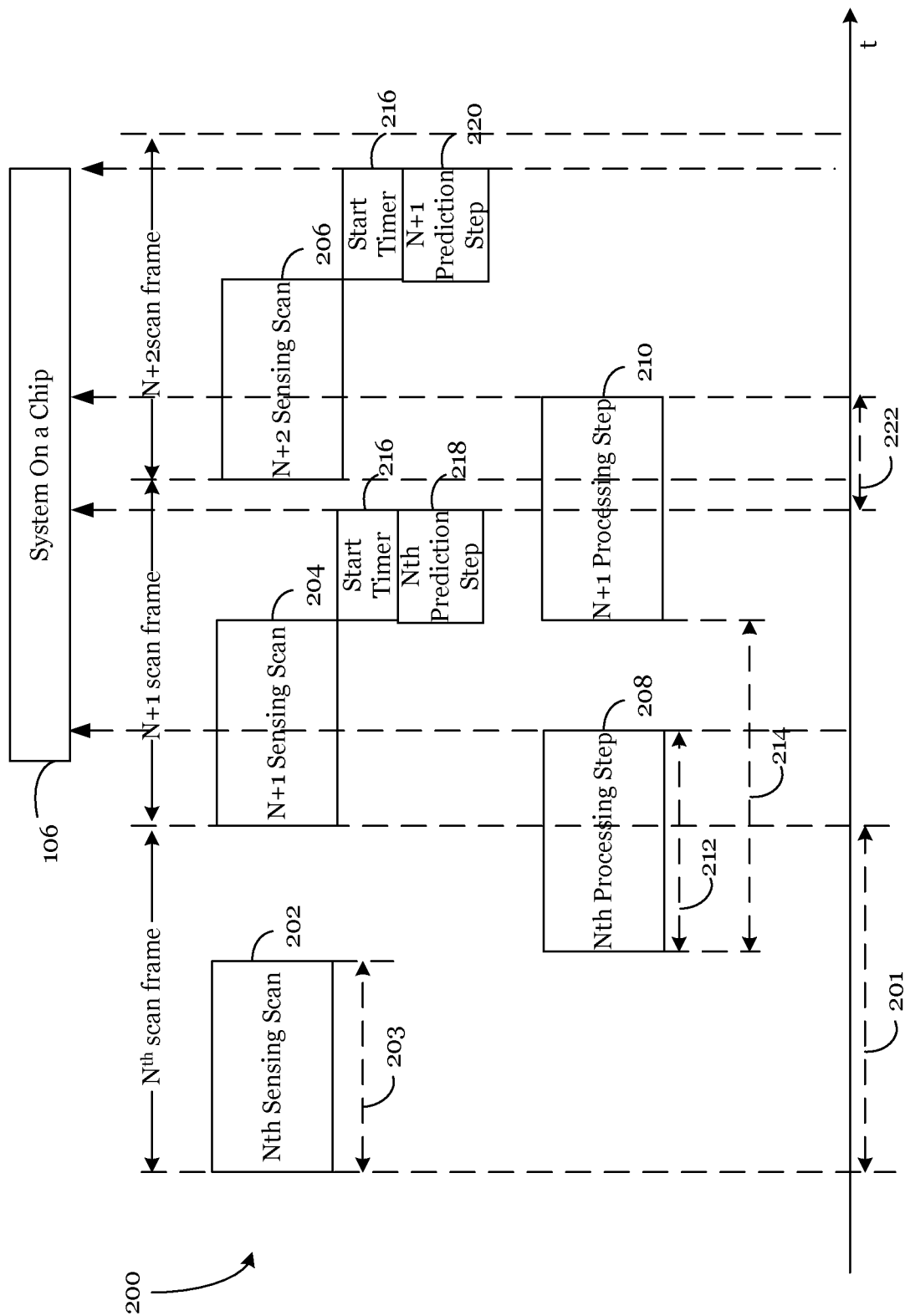
FIG. 2 illustrates example process steps for reporting touches on a touchscreen of the electronic device at an improved touch report rate in accordance with an embodiment of the present application.

FIG. 2 illustrates example process steps for reporting touches on a touchscreen 104 of an electronic device with an increased touch report rate with respect to a horizontal axis that represents time (t). The electronic device may be similar to the electronic device 100 discussed above.

Referring to graph 200 of FIG. 2, the touchscreen controller 102 may perform sensing scans during scan frames at a first frequency. The scan period 201 of each scan frame may be defined by the first frequency.

The first frequency (i.e. the scan rate of the sensing scans) may be 60 Hz, 120 Hz, 240 Hz, 480 Hz, 720 Hz, or any possible scan frequency of a touchscreen known in the art. For example the first frequency may be 240 Hz. Each of the scan periods 201, may be defined by the first frequency.

Each of the sensing scans may be configured to detect touch data corresponding to a touch, and therefore, may comprise a mutual and/or self-sensing scan in the same manner discussed above. Each of the sensing scans may be identical scans having a scan time 203 between 0.1 ms and 16.6 ms. For example if the first frequency is 240 Hz, the scan period is 1/240 or about 4.2 ms, and the scan time 203 may be between 0.1 and 4.2 ms; additionally, for example, if the first frequency is 60 Hz, the scan period is 1/60 or about 16.6 ms, and the scan time 203 may be between 0.1 and 16.6 ms. As understood by those with ordinary skill in the art, the scan time 203 may be less than the scan period 201.

In various embodiments, each sensing scan may detect touch data and store it in the memory of the system on a chip 106. The sensed touch data may be in the form of a matrix corresponding to each of the mutual capacitances 112 and/or self-capacitances 113, as described above.

For example the touchscreen controller 102 may perform a $N^{th}$ sensing scan 202 to detect $N^{th}$ touch data in an $N^{th}$ scan frame, an N+1 sensing scan 204 performed in an N+1 scan frame to detect N+1 touch data, and an N+2 sensing scan 206 performed in an N+2 scan frame to detect N+2 touch data, and so on.

In various embodiments, each sensing scan may accompany a processing step. In each processing step, the touchscreen controller 102 may process the data detected in a corresponding sensing scan and report the touch coordinates of touch detected in the immediately following scan frame. In FIG. 2, reporting of touch coordinates may be indicated by the vertical arrows pointing up. For example, the touchscreen controller 102 may perform an $N^{th}$ processing step 208 to process the $N^{th}$ touch data and report $N^{th}$ touch coordinates in the N+1 scan frame, and perform an N+1 processing step 210 to process the N+1 touch data and report N+1 touch coordinates in the N+2 scan frame, and so on.

In various embodiments, at the conclusion of each processing step, the touchscreen controller 102 may report the touch coordinates to the system on a chip 106.

The processing steps may be performed in parallel with the sensing scans. For example the $N^{th}$ processing step 208 may be performed in parallel with the N+1 sensing scan 204, and the N+1 processing step 210 may be performed in parallel with the N+2 sensing scan 206.

Each processing step may have a processing time 212 defined as the time that elapses between the start of the processing step and the reporting of touch coordinates. The processing time 212 may be less than, equal to, or greater than the scan time 203. For example the processing time 212 may be between 0.1 ms and 16 ms. The process time 212 is not limited by this application.

In various embodiments, each processing step may be performed at a second frequency. The second frequency may be less than, equal to, or greater than the first frequency. In other words, each processing step may be performed during a processing period 214 that may be less than, equal to, or greater than scan period 201.

In various embodiments, the touchscreen controller 102 may begin processing the touch data detected in the same scan frame or the next scan frame of a corresponding sensing scan. In embodiments where the touchscreen controller 102 begins the processing step in the same scan frame, it may begin the processing step after the corresponding sensing scan, or the processing step may be performed during the corresponding sensing scan so long as it begins after it.

For example, referring back to FIG. 2, the $N^{th}$ processing step 208 may begin in the N+1 scan frame or the $N^{th}$ scan frame. In embodiments where the touchscreen controller 102 begins the $N^{th}$ processing step 208 in the $N^{th}$ scan frame, it may begin the $N^{th}$ processing step 208 after the $N^{th}$ sensing scan 202. Alternatively, the touchscreen controller 102 may begin the $N^{th}$ processing step 208 during the $N^{th}$ sensing scan 202 so long as it begins after the $N^{th}$ sensing scan 202 begins. This may be applied to any other processing steps.

As understood by those with ordinary skill in the art, in conventional touch reporting methods, the touch responsiveness of the electronic device 100 may be limited because subsequent touches cannot be reported until the touchscreen controller 102 completes a subsequent sensing scan to detect subsequent touch data, and finishes processing the subsequent touch data. In other words, if this were a conventional touch reporting method, the electronic device 100 is limited to one touch report per sensing scan and cannot report a touch until after a sensing scan and a processing step are completed. Thus, the report rate of the electronic device is defined and limited to whichever is longer between the scan period 201 and the process period 214.

The inventors of this application have identified that typically the report rate is limited by the scan time 203. As described above, the scan time 203 cannot be reduced without reducing the sensitivity of the touchscreen 104. Thus, the report rate of conventional touch reporting methods may be limited to the first frequency (e.g. the scan frequency). In other words, because the report frequency of touch coordinates may be limited to the scan frequency, the processing and reporting of touches determined from detected touch data (e.g. sensing scans) may be performed at the first frequency.

Advantageously, as illustrated in FIG. 2, the touchscreen controller 102 may predict coordinates of a next touch based on the immediate previous touch and historical touch coordinates using the machine learning model 103. One advantage of this is that the touchscreen controller 102 can anticipate the next instance of touch from the previous touch data, and therefore, can report touch at an improved frequency (e.g. rate). This is because the frequency of change in touch in much slower than the scan rates and hence touch data from a series of previous touches can be used to determine the expected location of subsequent touch. This will be described in more detail below.

For example, as illustrated in FIG. 2, after the N+1 sensing scan 204, the touchscreen controller 102 may start a timer 216, and perform an $N^{th}$ prediction step 218 and report coordinates of a touch at the expiration of the timer. Similarly, after the N+2 sensing scan, the touchscreen controller 102 may start the timer 216, and perform an N+1 prediction step 220, predict and report coordinates of a touch at the expiration of the timer. The $N^{th}$ prediction step 218 may predict coordinates of a touch based on the touch coordinates determined in the $N^{th}$ processing step 208 and the historical touch data using the machine learning model 103. Also, the N+1 prediction step may predict coordinates of a touch based on the coordinates determined in the N+1 processing step 210 and the historical touch data using the machine learning model 103.

In various embodiments, the duration of the timer may be a fraction of the scan time 203. For example the duration of the timer may be equal to half the scan time.

In each prediction step, the touchscreen controller may use the machine learning model 103 to predict touch. The machine learning model 103 may be trained with historical touch data that is collected and processed prior to the $N^{th}$ sensing scan 202. The historical touch data may comprise a subset of previously sensed touch data and may be collected using previous sensing scans having the exact same parameters as each of the sensing scans.

In various embodiments, the machine learning model 103 may be trained using supervised learning to predict a touch by a user prior to the $N^{th}$ sensing scan 202. During supervised learning, the machine learning model 103 may infer or build a linear predictor function to be used in linear regression from training data that includes the historical touch data. As understood by those with ordinary skill in the art, the linear predictor function may comprise an unknown set of the parameters that are estimated and updated based on the historical touch data. In various embodiments, for example, the linear predictor function may be a second order linear predictor function. The order of the linear predictor function is not limited by this application.

The training data may comprise the historical touch data. In supervised training, the historical touch data may be labeled with the subsequent touch (e.g. the desired predicted touch). The linear prediction function analyzes each of subset of previously sensed touch data and self-updates its linear predictor function based on its predicted next touch location and the actual touch location the subset of previously sensed touch data is labeled with. Then, once the machine learning model can anticipate a next touch with a sufficient quantity of historical sensed touch data, the machine learning model 103 may be implemented onto the touchscreen controller 102. In various embodiments, the quantity of historical data is the quantity of historical touches required to train the machine learning model 103 to predict a next touch input above the threshold certainty. For example, the historical touch data may include 5 to 100 subsets of previously sensed touch data.

Advantageously, because the timer may be equal to half of the scan time 203 and starts at the end of subsequent sensing scans, the predicted touch coordinates may also be reported at the first frequency, but may be time shifted by half the scan time 203. In other words, the touchscreen controller 102 can alternate between reporting touches at the end of each processing step and reporting predicted touches. This allows the touchscreen controller 102 to report touches at a multiple of the first frequency. For example, the touchscreen controller 102 can report double the touches than a touchscreen controller in a conventional touch reporting method due to the duration of the timer. In other words, the time between reported touches 222 may be equal to half of the scan period 201.

Figure 3:
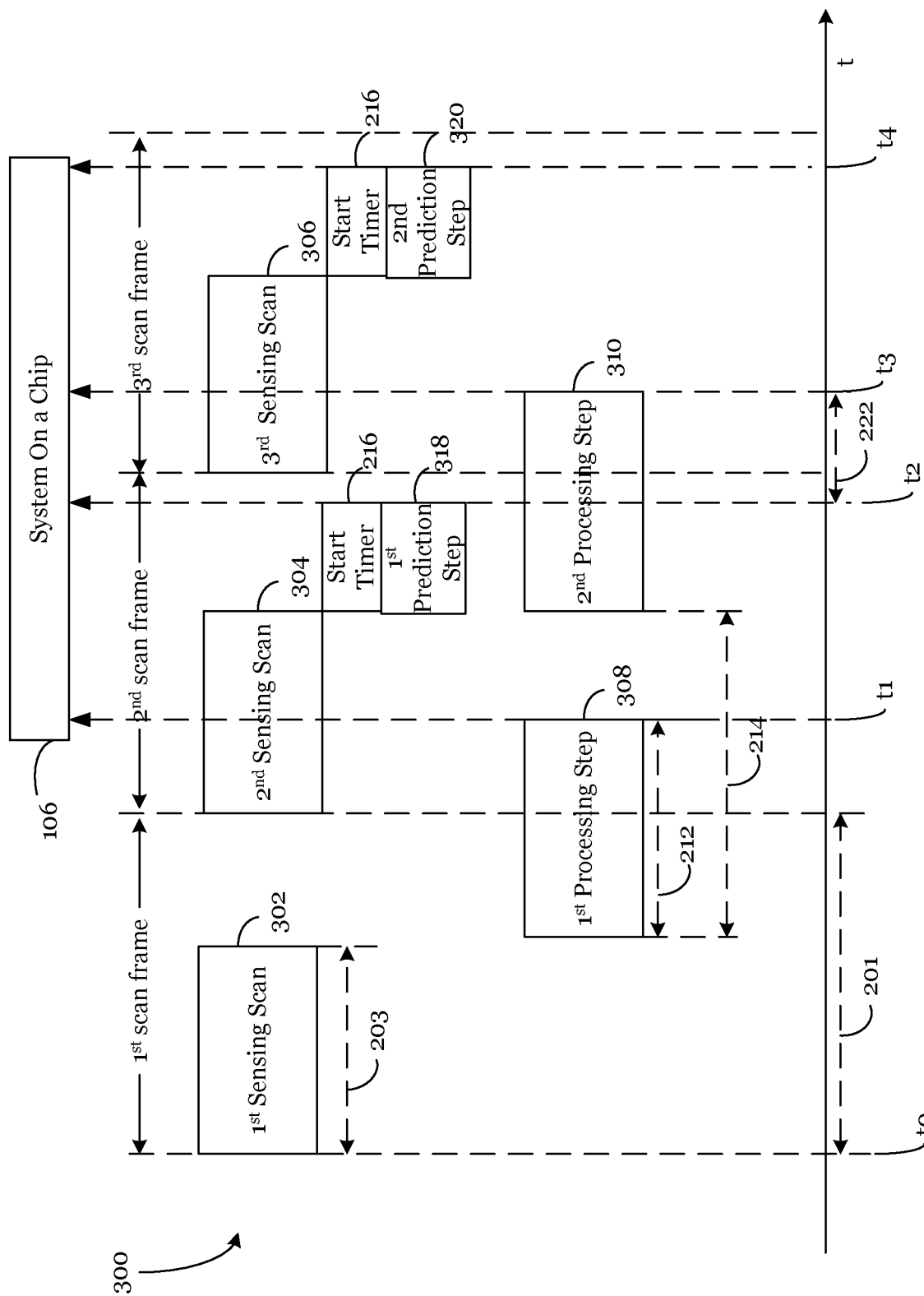
FIG. 3 illustrates example process steps for determining four touches on a touchscreen of the electronic device at an increased report rate in accordance with an embodiment of the present application.

FIG. 3 illustrates example process steps for determining four touches at an increased report rate.

Referring to graph 300 of FIG. 3, at start time t0, the touchscreen controller 102 may perform a first sensing scan 302 during a first scan frame. The first sensing scan 302 may be performed to detect a first touch on the touchscreen 104. In various embodiments, as described above, the first sensing scan 302 may be one of a plurality of sensing scans performed in a plurality of sensing periods defined by the first frequency.

As described above, each of the plurality of sensing scans may be accompanied by processing steps performed at a second frequency and in parallel with the sensing scans to determine the reported touch coordinates detected in the sensing scans. Therefore, the first sensing scan 302 may be accompanied by a first processing step 308 used to process the first touch data.

In the same manner described above, at the conclusion of the first processing step 308, the touchscreen controller 102 may report a first touch data at a first time t1. The first time t1 may occur during a second scan frame. Also in the same manner described above, the touchscreen controller 102 may begin the first processing step 308 during the first scan frame or during the second scan frame. If the first processing step 308 begins in the first scan frame it may be performed after the first sensing scan 302 or during the first sensing scan 302.

Also, in the second scan frame, the touchscreen controller 102 may begin a second sensing scan 304 to detect second touch data.

In various embodiments, the second sensing scan 304 may be performed in parallel with the first processing step 308.

After the second sensing scan, the touchscreen controller 102 may start the timer 216, perform a first prediction step 318 to determine coordinates of a second touch, i.e., the first predicted touch, and report the coordinates of the second touch at the expiration of the timer. In the same manner described above, the first prediction step may predict the coordinates of the second touch based on the first touch data and the historical touch data using the machine learning model 103. Due to the timer starting after the second sensing scan 304 and because it is equal to half the scan time 203, the touchscreen controller 102 may report the second touch coordinates at a second time t2 that occurs after t1. Also, as explained above, the time elapsed between reported touches 222 (which also applies to the time elapsed between t1 and t2) may be equal to half of the scan period 201. Therefore, as explained above, the touch report rate may be double the scan rate.

Referring back to FIG. 3, at the second frequency, the touchscreen controller 102 may also begin a second processing step 310 to process the second touch data, determine coordinates of a third touch using the second processing step 310, and report the coordinates of the third touch at a third time t3. For the reasons described above, the third time t3 may occur after the second time t2, and occur in the third scan frame.

Advantageously, as described above, if this was a conventional touch sensing method, the touchscreen controller 102 would be limited to only reporting the coordinates of the first touch and the third touch. However, due to the touchscreen controller 102 being configured to anticipate touch, it may predict the second touch at a time t2 between the first time t1 and a third time t3.

Then in the same manner described above, after performing a third sensing scan 306 in a third scan frame, the touchscreen controller 102 may start the timer 216 and predict the coordinates of a fourth touch using a second prediction step 320. During the second prediction step 320, the touchscreen controller 102 may predict the coordinates of a fourth touch based on the second touch data and the historical touch data using the machine learning model 103. Then at the expiration of the time timer, the touchscreen controller 102 may report the coordinates of the fourth touch at a fourth time t4 that occurs after the third time t3.

This process may then be continued for each additional sensing scan.

In various embodiments, the touch report rate may be defined as the number of touch coordinates reported in each scan frame. For example, as described above, two touch coordinates (e.g. one from a processing step and one from a prediction step) may be reported in each scan frame and may result in a touch report rate that is double the scan rate.

Advantageously, the touchscreen controller 102 may be configured to predict multiple coordinates of touch in a single scan frame. In other words, the touchscreen controller 102 may predict multiple touch coordinates from a single scan. One advantage of this is that the touch report rate may be a multiple greater than or equal to two of the scan rate.

Figure 4:
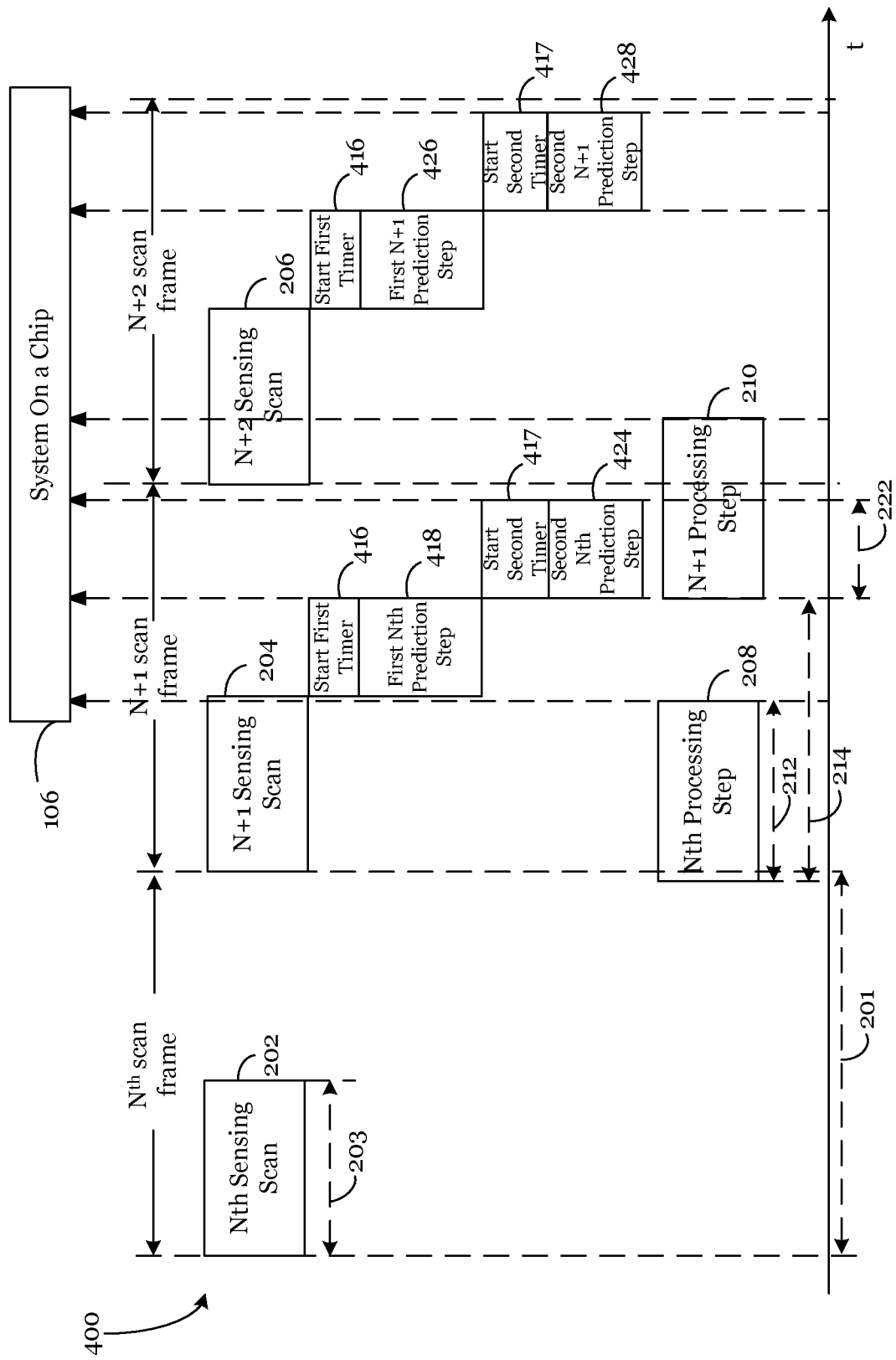
FIG. 4 illustrates example process steps for predicting multiple touches on a touchscreen of the electronic device in a single scan frame in accordance with an embodiment of the present application.

FIG. 4 illustrates example process steps for predicting multiple touches in a single scan frame.

Referring to graph 400 of FIG. 4, the touchscreen controller 102 may predict multiple coordinates of touch based on the immediate previous touch and historical touch coordinates using the machine learning model 103. In other words, the touch report rate may be any multiple of the scan rate.

For example, graph 400 illustrates an electronic device 100 configured to report three instances of touch in each scan frame. Therefore, the electronic device 100 illustrated in graph 400 may have a touch report rate that is triple the scan rate. In other words, the time between reported touches 222 may be reduced to one-third of the scan period 201 by reporting three touches in each scan frame.

Although graph 400 of FIG. 4 illustrates an electronic device 100 configured to report touch at three times the scan rate, this is for example purposes only. The touch report rate may be any multiple of the scan rate. For example, the electronic device 100 may be configured to report four touches in each scan frame at four times the scan rate, five touches in each scan frame at five times the scan rate, and so on.

Referring back to FIG. 4, after the N+1 sensing scan 204, the touchscreen controller 102 may start a first timer 416, perform a first $N^{th}$ prediction step 418 and report coordinates of a touch at the expiration of the first timer 416, start a second timer 417 at the expiration of the first timer 416, perform a second $N^{th}$ prediction step 424 and report coordinates of a touch at the expiration of the second timer 417. Similarly, after the N+2 sensing scan 206, the touchscreen controller 102 may start the first timer 416, perform a first N+1 prediction step 426 and report coordinates of a touch at the expiration of the first timer 416, start the second timer 417 at the expiration of the first timer 416, perform a second N+1 prediction step 428 and report coordinates of a touch at the expiration of the second timer 417.

The duration of the first timer 416 and the second timer 417 may be equal, and each of the prediction steps may be performed in the same manner discussed in FIG. 2 above.

The duration of the timer(s) may be determined based on the desired touch report rate. For example, as illustrated in graph 400, the timers may be one-third of the scan time 203 for a touch report rate that is triple the scan rate. Similarly, the timers may be one-fourth of the scan time 203 for a report rate that is four times the scan rate, the timers may be one-fifth of the scan time 203 for a report rate that is five times the scan rate, and so on.

The number of timers (e.g. the number of prediction steps in each frame) started in each scan frame may also be defined by the desired touch report rate. In other words, because one touch will be reported in each scan frame after each processing step, the number of timers may be equal to one minus the number of touches to be reported in each scan frame. For example, to report three touches in a scan frame the touchscreen controller 102 may report touches from a processing step and two prediction steps in each frame, to report four touches in a scan frame the touchscreen controller 102 may report touches from a processing step and three prediction steps in each frame, and so on.

For example, as illustrated in graph 400, two timers in each scan frame may be used for a report rate that is triple the scan rate. In other words the time between reported touches 222 may be one-third of the scan period 201, resulting in a report rate that is three times the scan rate.

Similarly, three timers in each scan frame may be required for a report rate that is four times the scan rate, four timers may be required for a report rate that is five times the scan rate, and so on.

Figure 5:
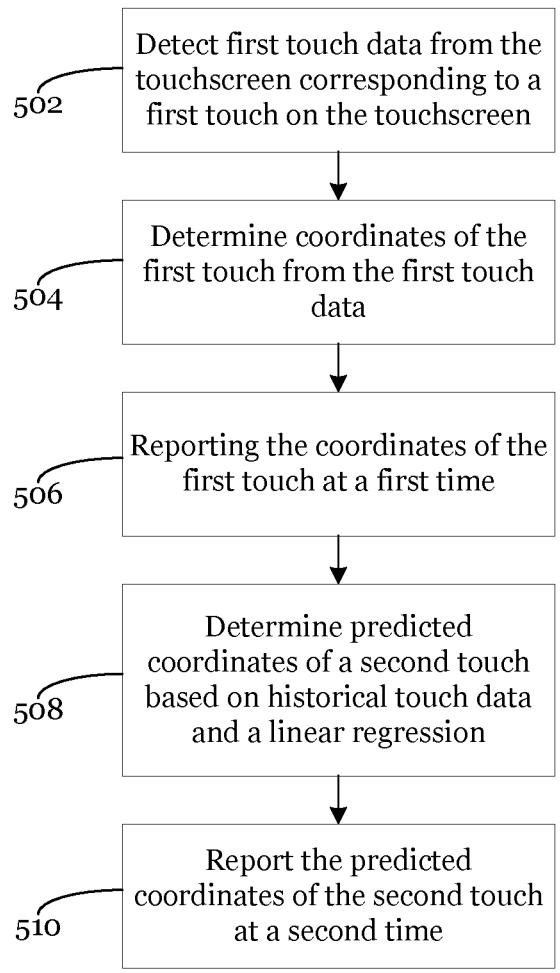
FIG. 5 illustrates a process flow for reporting first and second touch coordinates sensed by the touchscreen of the electronic device with an improved touch responsiveness in accordance with an embodiment of the present application.

FIG. 5 illustrates a process flow for reporting first and second touch coordinates sensed by a touchscreen with an improved touch responsiveness.

As illustrated in block 502 and described with reference to FIGS. 1-3, the touchscreen controller 102 may detect first touch data from the touchscreen 104 corresponding to a first touch on the touchscreen 104. In various embodiments, the touchscreen controller 102 may detect the first touch data by performing a first sensing scan 302 of the touchscreen 104. The first sensing scan 302 may be performed at a first frequency in the same manner discussed above.

As next illustrated in block 504 and described with reference to FIGS. 1-3, the touchscreen controller 102 may determine coordinates of the first touch from the first touch data. The touchscreen controller 102 may determine the coordinates of the first touch by performing a first processing step 308. The touchscreen controller 102 may begin the first processing step 308 during the first scan frame or during the second scan frame in the same manner described in FIG. 3 above.

As next illustrated in block 5o6 and described with reference to FIGS. 1-3, after the touchscreen controller 102 determines the first touch coordinates, it may report them at a first time t1. The touchscreen controller 102 may report the first touch coordinates to the system on a chip 106 in the same manner described in FIGS. 2 and 3.

As next illustrated in block 508, and described with reference to FIGS. 1-3 the touchscreen controller 102 may determine predicted coordinates of a second touch based on the first touch data, historical touch data, and a linear regression.

In various embodiments, the predicted coordinates of a second touch may be determined by: performing the second sensing scan 304, starting the timer 216 after performing the second sensing scan 304, and predicting the coordinates of the second touch using the first prediction step 318. The first prediction step 318 may be performed in the same manner described in FIGS. 2 and 3. In other words the predicted of a second touch may be determined by the touchscreen controller 102 based on the first touch data and the historical touch data using the machine learning model 103.

Also, as described above, because the timer does not start until after performing the second sensing scan 304 and is equal to the scan time 203, the coordinates of the second touch may be predicted at the first frequency but are time-shifted in relation to the reporting of the first touch coordinates. Therefore, the predicted second coordinates may be reported a second time t2 that occurs after the first time t1.

As next illustrated in block 510 and described with reference to FIGS. 1-3, at the second time t2, the touchscreen controller 102 may report the predicted coordinates of the predicted second touch to the system on a chip 106. Advantageously, as discussed above the time difference between t1 and t2 may be equal to half the scan period 201. In other words, the report rate of the electronic device 100 may be double the scan rate.

Alternatively, as described in FIG. 4 above, the report rate of the electronic device 100 may be configured to be a multiple greater than two (e.g. double) the scan rate. Therefore, in each scan frame the quantity and duration of timers along with the number of prediction steps in each scan frame may be determined based on the desired report rate.

In other words, if the desired report rate of the electronic device is double the scan rate, third coordinates of touch may be reported in the third scan frame using a second processing step 310 in the same manner described in FIG. 3. On the other hand, if the desired report rate is a multiple greater than two of the scan rate, additional timers and corresponding predication steps may be used to report additional instances of touch in the second frame in the same manner described in FIG. 4.

Example embodiments of the invention are summarized here. Other embodiments can also be understood from the entirety of the specification as well as the claims filed herein.

Example 1. A method for reporting touch on a touchscreen, the method including: detecting first touch data from the touchscreen corresponding to a first touch on the touchscreen; determining coordinates of the first touch from the first touch data; reporting the coordinates of the first touch at a first time; determining predicted coordinates of a second touch based on a linear regression of historical touch data; and reporting the predicted coordinates of the second touch at a second time, where the second time occurs after the first time.

Example 2. The method of example 1, where detecting determining predicted coordinates of a second touch further includes starting a timer after detecting second touch data, where a duration of the timer is equal to half of a time required to detect the first touch data; and where reporting the predicted coordinates of the second touch at a second time further includes reporting the predicted coordinates of the second touch at an expiration of the timer.

Example 3. The method of one of examples 1 or 2, further including: detecting second touch data from the touchscreen corresponding to a third touch on the touchscreen; determining coordinates of the third touch from the second touch data; reporting the coordinates of the third touch at a third time, where the third time occurs after the second time; determining predicted coordinates of a fourth touch based on a linear regression of the historical touch data; and reporting the predicted coordinates of the fourth touch at a fourth time, where the fourth time occurs after the third time.

Example 4. The method of one of examples 1 to 3, where detecting first touch data from the touchscreen, determining coordinates of the first touch, reporting the coordinates of the first touch, determining predicted coordinates of the second touch, and reporting the predicted coordinates of the second touch are all performed in a touchscreen controller.

Example 5. The method of one of examples 1 to 4, where a difference between the first time and the second time is equal to half of a scan period of a scan used to detect the first touch data.

Example 6. The method of one of examples 1 to 5, where detecting first touch data from the touchscreen includes performing a mutual sensing scan to detect the first touch data.

Example 7. The method of one of examples 1 to 6, where detecting first touch data from the touchscreen includes performing a self sensing scan to detect the first touch data.

Example 8. The method of one of examples 1 to 7, where detecting first touch data from the touchscreen includes performing a mutual sensing scan and a self sensing scan.

Example 9. The method of one of examples 1 to 8, where the historical touch data includes coordinates of a quantity of touches determined prior to the detecting first touch data from the touchscreen.

Example 10. The method of one of examples 1 to 9, where the quantity of touches determined prior to the detecting first touch data from the touchscreen is a value between 5 and 100.

Example 11. The method of one of examples 1 to 10, where the linear regression includes a second order linear regression.

Example 12. A method for reporting touch on a touchscreen, the method including: performing, at a suitable frequency, a sensing scan of the touchscreen to obtain sensed touch data; storing, in a non-transitional memory, the obtained sensed touch data; determining, at the first frequency, a first calculated touch data based on a machine learning model and the sensed touch data; and transmitting, at a multiple of the first frequency, the sensed touch data or the first calculated touch data to an external device.

Example 13. The method of example 12, where the multiple of the first frequency is two times the first frequency.

Example 14. The method of one of examples 12 or 13, further including: determining, at the first frequency, a second calculated touch data based on the machine learning model and the sensed touch data, where the transmitting includes transmitting the second calculated touch data to the external device.

Example 15. The method of one of examples 12 to 14, where calculating the first calculated touch data based on the machine learning model and the sensed touch data includes calculating the first calculated touch data based on the machine learning model and a subset of previously sensed touch data.

Example 16. The method of one of examples 12 to 15, where the subset of previous sensed touch data includes 5 to 100 sets of touch data.

Example 17. The method of one of examples 12 to 16, where the sensing scan includes a mutual sensing scan.

Example 18. The method of one of examples 12 to 17, where the sensing scan includes a self sensing scan.

Example 19. The method of one of examples 12 to 18, where the sensing scan includes a mutual sensing scan and a self sensing scan.

Example 20. A device including: a touchscreen; a processor; a memory for storing a program to be executed in the processor, the program including instructions when executed cause the processor to: detect first touch data from the touchscreen corresponding to a first touch on the touchscreen; determine coordinates of the first touch from the first touch data; report the coordinates of the first touch at a first time; determine predicted coordinates of a second touch based on historical touch data and a linear regression; and report the predicted coordinates of the second touch at a second time, where the second time occurs after the first time.

Example 21. The device of example 20, where the program further includes instructions to: configure a difference between the first time and the second time that is equal to half of a period of a sensing scan to detect the first touch data.

Example 22. The device of one of examples 20 or 21, where the program further includes instructions to: determine the historical touch data prior to detecting first touch data from the touchscreen.

Example 23. The device of one of examples 20 to 22, where the program further includes instructions to: detect second touch data from the touchscreen corresponding to a third touch on the touchscreen; determine coordinates of the third touch from the second touch data; report the coordinates of the third touch at a third time, where the third time occurs after the second time; determine predicted coordinates of a fourth touch based on historical touch data and a linear regression; and report the predicted coordinates of the fourth touch at a fourth time, where the fourth time occurs after the third time.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for reporting touch on a touchscreen, the method comprising:
   detecting first touch data from the touchscreen corresponding to a first touch on the touchscreen;
   determining coordinates of the first touch from the first touch data;
   reporting the coordinates of the first touch at a first time;
   determining, using a trained machine learning model, predicted coordinates of a second touch based on a linear regression of historical touch data, wherein the trained machine learning model is obtained by training, using supervised learning, a machine learning model with the historical touch data, the training comprising building a machine learning model from the historical touch data, updating the machine learning model by comparing predicted touch data with actual touch data obtained by the touchscreen, storing the updated machine learning model as the trained machine learning model in response to determining that a predicted accuracy of a next touch is greater than a predetermined threshold; and
   reporting the predicted coordinates of the second touch at a second time, wherein the second time occurs after the first time.

2. The method of claim 1, wherein determining the predicted coordinates of the second touch further comprises starting a timer after detecting second touch data, wherein a duration of the timer is equal to half of a time required to detect the first touch data; and
   wherein reporting the predicted coordinates of the second touch at a second time further comprises reporting the predicted coordinates of the second touch at an expiration of the timer.

3. The method of claim 1, further comprising:
   detecting second touch data from the touchscreen corresponding to a third touch on the touchscreen;
   determining coordinates of the third touch from the second touch data;
   reporting the coordinates of the third touch at a third time, wherein the third time occurs after the second time;
   determining predicted coordinates of a fourth touch based on a linear regression of the historical touch data; and
   reporting the predicted coordinates of the fourth touch at a fourth time, wherein the fourth time occurs after the third time.

4. The method of claim 1, wherein detecting first touch data from the touchscreen, determining coordinates of the first touch, reporting the coordinates of the first touch, determining predicted coordinates of the second touch, and reporting the predicted coordinates of the second touch are all performed in a touchscreen controller.

5. The method of claim 1, wherein a difference between the first time and the second time is equal to half of a scan period of a scan used to detect the first touch data.

6. The method of claim 1, wherein detecting first touch data from the touchscreen comprises performing a mutual sensing scan to detect the first touch data.

7. The method of claim 1, wherein detecting first touch data from the touchscreen comprises performing a self sensing scan to detect the first touch data.

8. The method of claim 1, wherein detecting first touch data from the touchscreen comprises performing a mutual sensing scan and a self sensing scan.

9. The method of claim 1, wherein the historical touch data comprises coordinates of a quantity of touches determined prior to the detecting first touch data from the touchscreen.

10. The method of claim 9, wherein the quantity of touches determined prior to the detecting first touch data from the touchscreen is a value between 5 and 100.

11. The method of claim 1, wherein the linear regression comprises a second order linear regression.

12. A device comprising:
a touchscreen;
a processor;
a memory for storing a program to be executed in the processor, the program comprising instructions when executed cause the processor to:
detect first touch data from the touchscreen corresponding to a first touch on the touchscreen;
determine coordinates of the first touch from the first touch data;
report the coordinates of the first touch at a first time;
determine, using a trained machine learning model, predicted coordinates of a second touch based on historical touch data and a linear regression, wherein the trained machine learning model is obtained by training, using supervised learning, a machine learning model with the historical touch data, the training comprising building a machine learning model from the historical touch data, updating the machine learning model by comparing predicted touch data with actual touch data obtained by the touchscreen, storing the updated machine learning model as the trained machine learning model in response to determining that a predicted accuracy of a next touch is greater than a predetermined threshold; and
report the predicted coordinates of the second touch at a second time, wherein the second time occurs after the first time.

13. The device of claim 12, wherein the program further comprises instructions to:
configure a difference between the first time and the second time that is equal to half of a period of a sensing scan to detect the first touch data.

14. The device of claim 12, wherein the program further comprises instructions to:
determine the historical touch data prior to detecting first touch data from the touchscreen.

15. The device of claim 12, wherein the program further comprises instructions to:
detect second touch data from the touchscreen corresponding to a third touch on the touchscreen;
determine coordinates of the third touch from the second touch data;
report the coordinates of the third touch at a third time, wherein the third time occurs after the second time;
determine predicted coordinates of a fourth touch based on historical touch data and a linear regression; and
report the predicted coordinates of the fourth touch at a fourth time, wherein the fourth time occurs after the third time.

16. The method of claim 1, further comprising training the machine learning model using the historical touch data to obtain the trained machine learning model, the trained machine learning model outputting the predicted coordinates of the second touch based on the linear regression.

17. The method of claim 1, wherein the detecting of the first touch data, the determining coordinates of the first touch, and the reporting the coordinates of the first touch are repeated at a first frequency, and wherein the determining predicted coordinates of the second touch and the reporting the predicted coordinates of the second touch are repeated at a second frequency, the second frequency being equal to or a multiple of the first frequency.

18. A method for reporting touch on a touchscreen, the method comprising:
training, using supervised learning, a machine learning model using historical touch data to obtain a trained machine learning model, the training comprising
building a machine learning model from the historical touch data,
updating the machine learning model by comparing predicted touch data with actual touch data obtained by the touchscreen, and
storing the updated machine learning model as the trained machine learning model in response to determining that a predicted accuracy of a next touch is greater than a predetermined threshold;
detecting first touch data from the touchscreen corresponding to a first touch on the touchscreen;
determining coordinates of the first touch from the first touch data;
reporting the coordinates of the first touch at a first time;
determining, using the trained machine learning model, predicted coordinates of a second touch; and
reporting the predicted coordinates of the second touch at a second time, wherein the second time occurs after the first time.

19. The method of claim 18, wherein determining the predicted coordinates of the second touch further comprises starting a timer after detecting second touch data, wherein a duration of the timer is equal to half of a time required to detect the first touch data; and
wherein reporting the predicted coordinates of the second touch at a second time further comprises reporting the predicted coordinates of the second touch at an expiration of the timer.

20. The method of claim 18, further comprising:
detecting second touch data from the touchscreen corresponding to a third touch on the touchscreen;
determining coordinates of the third touch from the second touch data;
reporting the coordinates of the third touch at a third time, wherein the third time occurs after the second time;
determining predicted coordinates of a fourth touch based on a linear regression of the historical touch data; and
reporting the predicted coordinates of the fourth touch at a fourth time, wherein the fourth time occurs after the third time.

21. The method of claim 18, wherein detecting first touch data from the touchscreen, determining coordinates of the first touch, reporting the coordinates of the first touch, determining predicted coordinates of the second touch, and reporting the predicted coordinates of the second touch are all performed in a touchscreen controller.

* * * * *